US009836931B1

(12) United States Patent
Rivaud et al.

(10) Patent No.: US 9,836,931 B1
(45) Date of Patent: Dec. 5, 2017

(54) HAPTIC STRENGTH RESPONSIVE TO MOTION DETECTION

(71) Applicants: Daniel Rivaud, Ottawa (CA); Michael Gazier, Ottawa (CA); Kevin Estabrooks, Nepean (CA)

(72) Inventors: Daniel Rivaud, Ottawa (CA); Michael Gazier, Ottawa (CA); Kevin Estabrooks, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/175,917

(22) Filed: Jun. 7, 2016

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
CPC ............................. G08B 6/00; A61B 5/02555
USPC ........ 340/407.1, 407.2, 506, 539.12, 539.22; 600/301, 595, 483, 372, 393
See application file for complete search history.

(56) References Cited

U.S. PATENT DOCUMENTS

2004/0046658 A1* 3/2004 Turner ............... G08B 21/0227 340/539.11
2004/0209594 A1* 10/2004 Naboulsi ................ G08B 21/06 455/404.1
2008/0294019 A1* 11/2008 Tran ..................... A61B 5/0006 600/301
2017/0143238 A1* 5/2017 Nair ...................... A61B 5/1115

OTHER PUBLICATIONS

"IFTTT", Retreived from http://ifttt.comlwtf, on Jun. 7, 2016. (22 pages).
"Google Brillo", Retreived from https://developers.google.com/brillo/, on Jun. 7, 2016. (4 pages).
"Homekit", Retreived from http://www.apple.com/ios/homekit/, on Jun. 7, 2016. (7 pages).

* cited by examiner

*Primary Examiner* — Tai T Nguyen
(74) *Attorney, Agent, or Firm* — Osha Liang LLP

(57) ABSTRACT

A method may include obtaining sensor data from sensors of a primary device, determining a sensor pattern based on the sensor data, generating a response based on the sensor pattern, and sending a signal over a network to a secondary device to trigger an action of the secondary device. The signal may be based on the sensor pattern.

20 Claims, 5 Drawing Sheets

HAPTIC STRENGTH RESPONSIVE TO MOTION DETECTION

BACKGROUND

Electronic devices provide various forms of feedback. Haptic feedback has been increasingly incorporated in mobile electronic devices, such as mobile telephones, personal digital assistants (PDAs), portable gaming devices, and a variety of other mobile electronic devices. Haptic feedback engages the sense of touch through the application of force, vibration, or motion, and may be useful in guiding user behavior and/or communicating information to the user about device-related events.

Existing devices may have a static haptic setting that may be adjusted by the user. However, our sensitivity to touch varies with motion. For example, the sense of touch may be heightened when one is still, relative to when one is moving actively. For example, while sitting still one may feel the haptic vibration of a wearable device on the wrist quite strongly. However, when one's arm is in motion (e.g., running, gardening, painting), one's sense of touch may become less sensitive, and it may be possible to miss the haptic alert entirely.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including obtaining sensor data from sensors of a primary device, determining a sensor pattern based on the sensor data, generating a response based on the sensor pattern, and sending a signal over a network to a secondary device to trigger an action of the secondary device. The signal is based on the sensor pattern.

In general, in one aspect, one or more embodiments relate to a primary device including sensors, effectors, a sensor analyzer configured to obtain sensor data from the sensors, and determine a sensor pattern based on the sensor data, and a response generator configured to cause the effectors to generate a response based on the sensor pattern, and send a signal over a network to a secondary device to trigger an action of the secondary device. The signal is based on the sensor pattern.

In general, in one aspect, one or more embodiments of the invention relate to a processing system for a primary device including sensor analyzer circuitry configured to obtain sensor data from sensors, and determine a sensor pattern based on the sensor data, and response generator circuitry configured to cause effectors to generate a response based on the sensor pattern, and send a signal over a network to a secondary device to trigger an action of the secondary device. The signal is based on the sensor pattern.

Other aspects of the invention will be apparent from the following description and the appended claims.

DETAILED DESCRIPTION

Figure 1:
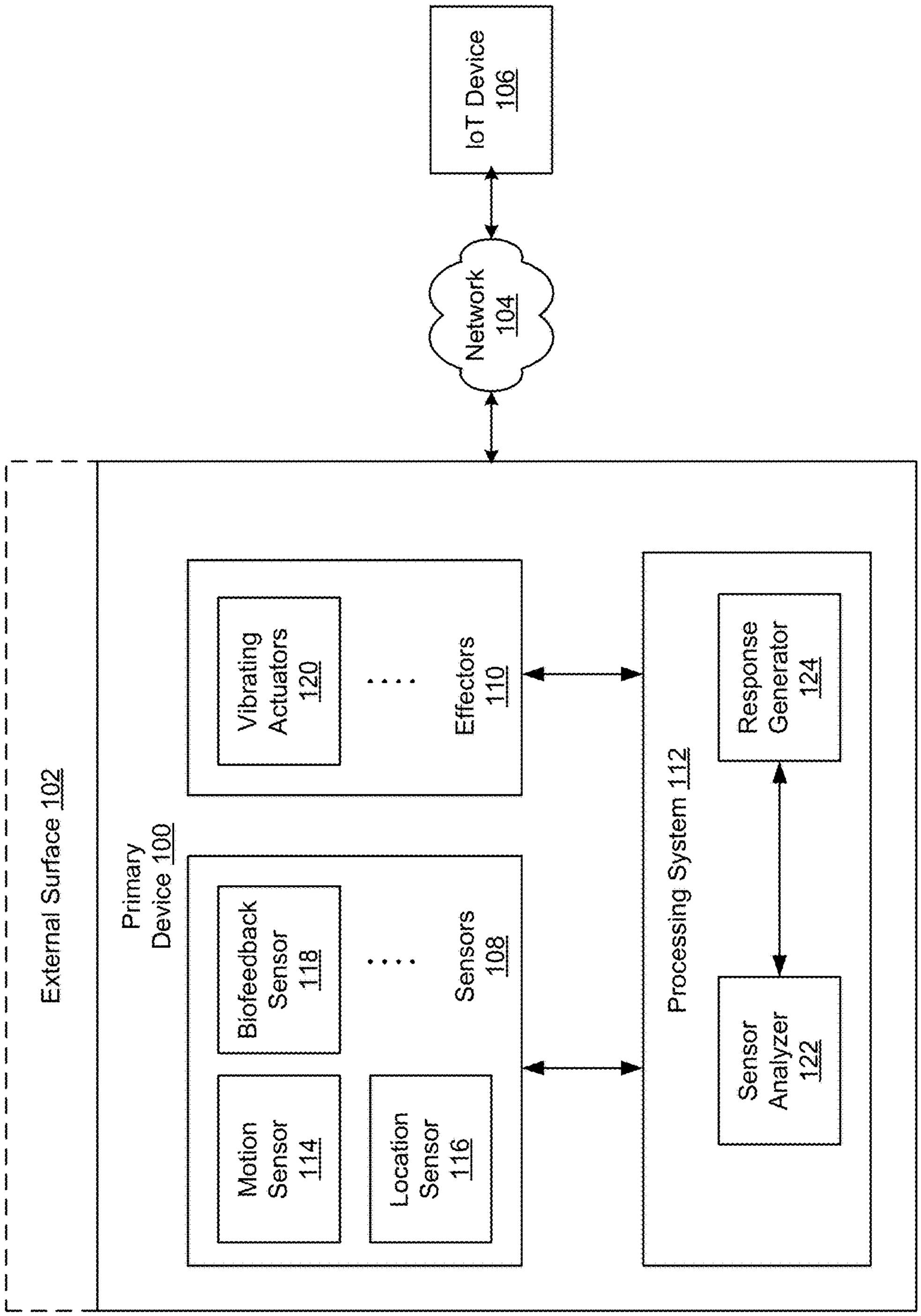
FIG. 1 shows a system in accordance with one or more embodiments disclosed herein.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and device for generating a response based on a sensor pattern determined by analyzing sensor data (e.g., motion sensor data). The response may be haptic, acoustic, and/or visual, and may include an on-screen event of the device. The response may function as an alert to direct a user toward a course of action within the context of an activity that is correlated with the sensor pattern. A vocabulary of "smart" responses may be interpreted as having meaning within the context of the activity performed by the user. For example, an inflection point in a motion pattern may be the basis for synchronizing a response to a repetitive activity (e.g., arm movements during jogging). For example, the response may be synchronized to the point where motion has stopped due to a change in direction. The response may also be adjusted based on an impedance (e.g., loose vs. tight fit of a wearable device) and/or texture (e.g., hardness vs. softness of a table) of an external surface adjacent to the device. For example, a loose fit may result in a weak felt vibration, and a tight fit may result in a stronger felt vibration. Determining an inflection point in periodic motion (e.g., wrist movement during running) may also be used to trigger other sensor measurements (e.g., an optical heart-rate sensor) that may be less accurate during movement. The response may be escalated when an alert is unacknowledged. A signal may be sent to a secondary device, such as an Internet of Things (IoT) device to trigger an action of the IoT device, based on the sensor pattern.

Figure 5A:
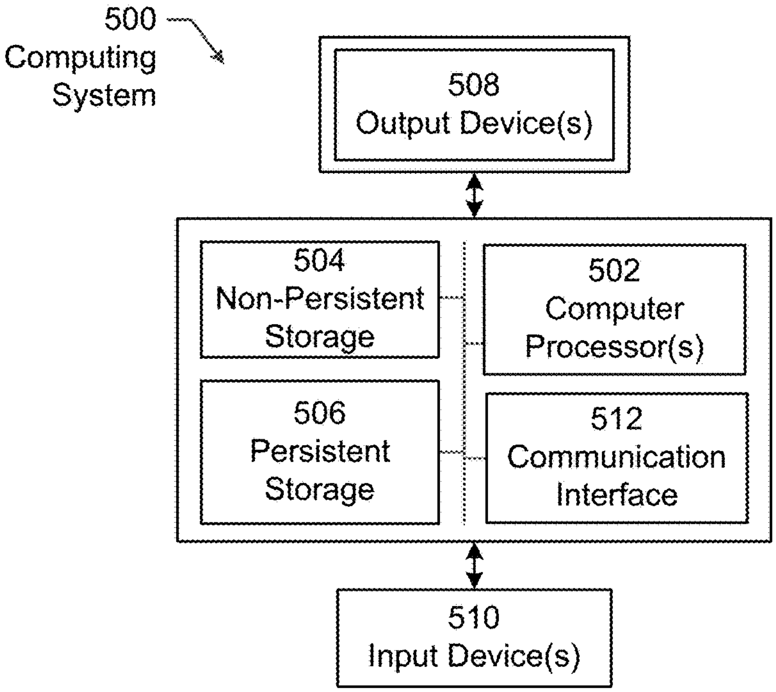
FIG. 5A and FIG. 5B show computing systems in accordance with one or more embodiments disclosed herein.
Figure 5B:
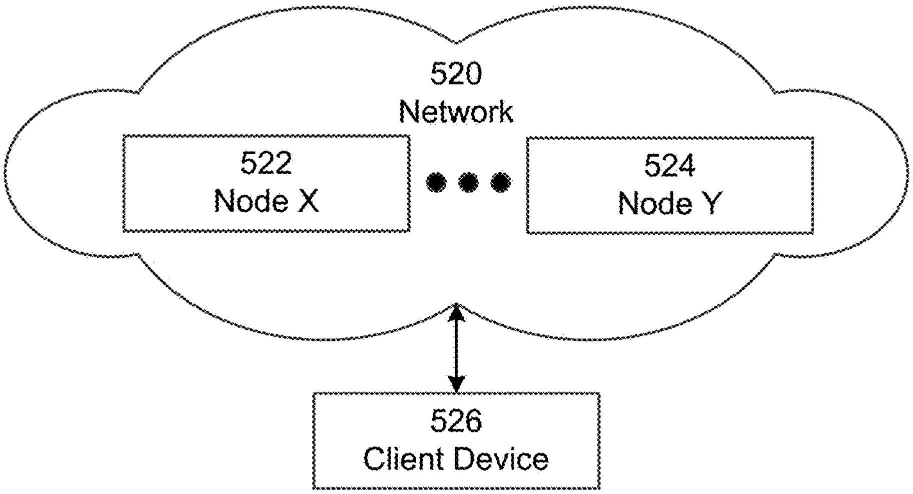

FIG. 1 shows a system in accordance with one or more embodiments. As shown in FIG. 1, the system may include a primary device (100), an external surface (102), a network (104), and an Internet of Things (IoT) device (106). In one or more embodiments, both the primary device (100) and IoT device (106) may be the computing system (500) described with respect to FIG. 5A and the accompanying description below, or may be the client device (526)

described with respect to FIG. 5B. Furthermore, the network (104) may be the network (520) described with respect to FIG. 5B.

The primary device (100) may be any computing device, such as a smart phone, a wearable computing device, a tablet, a laptop computer, a desktop computer, etc. In some embodiments, the primary device (100) may be equipped with a user interface. In one or more embodiments disclosed herein, the primary device (100) may be operated by a user (not shown). The user may be any person or entity using the primary device (100).

In one or more embodiments of the invention, the external surface (102) may be any object or material in contact with the primary device (100). For example, the external surface (102) may be a hard surface (e.g., a table) on which the primary device (100) has been placed. Alternatively, the external surface (102) may be a soft surface (e.g., a pants pocket or wrist band) in contact with the primary device (100) (e.g., the primary device (100) may be a smartphone or wearable device). The external surface (102) may be flat, spherical, or any other shape, and may be constructed from any material.

In one or more embodiments, the IoT device (106) may be any device connected to the network (104). Examples of IoT devices include devices controlling access to various types of industrial equipment (e.g., factory and capital equipment used in manufacturing), various types of consumer-facing equipment (e.g., appliances, such as refrigerators, ovens, televisions, radios, set-top-boxes, laundry machines, heating systems, alarm clocks, and exercise equipment), medical devices, etc.

As shown in FIG. 1, the primary device (100) has multiple components including sensors (108), effectors (110), and a processing system (112). In one or more embodiments, the sensors (108) may include a motion sensor (114), a location sensor (116), and one or more biofeedback sensors (118). In one or more embodiments of the invention, sensors (108) may also include capacitive, elastive, resistive, inductive, conductive, magnetic, barometric, heat, pressure, infrared, acoustic, ultrasonic, and/or optical sensors (e.g., cameras). In various embodiments, sensors (108) and effectors (110) may reside within surfaces of casings (e.g., where face sheets may be applied over sensor electrodes or any casings, etc.).

In one or more embodiments of the invention, the motion sensor (114) may be used to detect translational motion (e.g., velocity and/or acceleration) as the primary device (100) travels through space (e.g., the motion of an arm during exercise). In one or more embodiments, the motion sensor (114) may be used to detect vibratory motion of the primary device (100) (e.g., vibrations produced by the effectors (110) of the primary device (100)). The motion sensor (114) may also be used to detect rotational motion (e.g., torque) of the primary device (100). In one or more embodiments, the motion sensor (114) may be an accelerometer. The location sensor (116) may be a global positioning system (GPS) sensor, or any sensor capable of detecting the location of the primary device (100).

In one or more embodiments of the invention, a biofeedback sensor (118) may be any sensor capable of detecting a physical state of a user of the primary device (100). Examples of biofeedback sensors (118) may include heart rate sensors, sensors that measure the levels of a substance in the blood (e.g., oxygen, glucose, or a medication), skin conductivity sensors, thermometers, respiration sensors, muscle tone sensors, electrocardiography (EKG) sensors, and electrophysiological (e.g., electroencephalography (EEG)) sensors.

In one or more embodiments of the invention, effectors (110) may include vibrating actuators (120). The vibrating actuators (120) may be used to generate a haptic signal. Alternatively, other types of effectors (110) may be used to provide a haptic, visual, auditory, electrostatic and/or any other type of response (e.g., an on-screen event on the primary device (100), sending an SMS message or email, posting to social media, etc.).

In one or more embodiments of the invention, the haptic signal may be generated using a grid of vibrating actuators (120) in a haptic layer beneath the surface of the primary device (100). The top surface of the haptic layer may be situated adjacent to the bottom surface of an electrical insulated layer, while the bottom surface of the haptic layer may be situated adjacent to a display. In one or more embodiments of the invention, each vibrating actuator (120) may further include at least one piezoelectric material, Micro-Electro-Mechanical Systems ("MEMS") element, electromagnet, thermal fluid pocket, MEMS pump, resonant device, variable porosity membrane, laminar flow modulation, or other assembly that may be actuated to move the surface of the primary device (100). Each vibrating actuator (120) may be configured to provide a haptic effect independent of other vibrating actuators (120). Each vibrating actuator (120) may be adapted to be activated independently of the other vibrating actuators (120).

Continuing with FIG. 1, the processing system (112) may include a sensor analyzer (122) and a response generator (124). In one or more embodiments of the invention, the processing system (112) includes parts of, or all of, one or more integrated circuits (ICs) and/or other circuitry components. For example, a processing system for a mutual capacitance sensor may include transmitter circuitry configured to transmit signals with transmitter sensor electrodes, and/or receiver circuitry configured to receive signals with receiver sensor electrodes. Further, a processing system for an absolute capacitance sensor may include driver circuitry configured to drive absolute capacitance signals onto sensor electrodes, and/or receiver circuitry configured to receive signals with those sensor electrodes.

In one or more embodiments, a processing system for a combined mutual and absolute capacitance sensor may include any combination of the above described mutual and absolute capacitance circuitry. In some embodiments, the processing system (112) also includes electronically-readable instructions, such as firmware code, software code, and/or the like. In some embodiments, components composing the processing system (112) are located together, such as near sensing element(s) of the primary device (100). In other embodiments, components of processing system (112) are physically separate with one or more components close to the sensing element(s) of the primary device (100), and one or more components elsewhere. For example, the primary device (100) may be a peripheral coupled to a computing device, and the processing system (112) may include software configured to run on a central processing unit of the computing device and one or more ICs (perhaps with associated firmware) separate from the central processing unit. As another example, the primary device (100) may be physically integrated in a mobile device, and the processing system (112) may include circuits and firmware that are part of a main processor of the mobile device. In some embodiments, the processing system (112) is dedicated to implementing the primary device (100). In other embodiments, the processing system (112) also performs other functions, such as operating display screens, etc.

The processing system (112) may be implemented as a set of modules that handle different functions of the processing system (112). Each module may include circuitry that is a part of the processing system (112), firmware, software, or a combination thereof. In various embodiments, different combinations of modules may be used.

Although FIG. 1 shows the processing system (112) including a sensor analyzer (122) and a response generator (124), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as display screens, data processing modules, and reporting modules for reporting information. Further, the various modules may be combined in separate integrated circuits. For example, a first module may be included at least partially within a first integrated circuit and a separate module may be included at least partially within a second integrated circuit. Further, portions of a single module may span multiple integrated circuits. In some embodiments, the processing system as a whole may perform the operations of the various modules.

In one or more embodiments, the sensor analyzer (122) may include functionality to receive sensor data from one or more sensors (108). Sensor data may be represented in terms of the values of one or more sensor attributes measured at different points in time. A sensor pattern may be determined for a series of sensor attribute values. A sensor pattern may represent an interpretation of the sensor data that may be important to the user of the primary device (100). In one or more embodiments, sensor patterns may be assigned pre-determined priorities (e.g., certain patterns in the data obtained from biofeedback sensors (118) may be assigned a high priority). In one or more embodiments, the sensor analyzer (122) may include functionality to detect that the sensor pattern is periodic, such that the sensor pattern may be represented in terms of amplitude, frequency, period and/or phase.

For example, the sensor analyzer (122) may include functionality to receive motion data from the motion sensor (114). In one or more embodiments, motion data may be represented in terms of one or more motion attributes, including the velocity, acceleration, torque and/or orientation of the primary device (100). In one or more embodiments, the acceleration may include acceleration values for the x, y and z coordinate axes of the primary device (100).

In one or more embodiments, the sensor analyzer (122) may include functionality to receive vibration data from the motion sensor (114) (e.g., produced by the vibrating actuators (120)). In one or more embodiments, the vibration data may be represented in terms of one or more vibration attributes, including the velocity, acceleration and damping of the primary device (100).

In one or more embodiments, an inflection point in a motion pattern may represent a useful point to provide feedback to a user of the primary device (100). An inflection point may be the point where a pre-determined acceleration or velocity is reached. In one or more embodiments, an inflection point may be the point where the direction of motion changes. For example, the point where velocity reaches zero may be a useful inflection point to alert the user. For example, during jogging, a response that is synchronized to the apex of arm motion (e.g., where the velocity of the arm becomes zero) may be used to assist the user of the primary device (100) in maintaining a pre-determined pace. As another example, a response may be synchronized to a pattern in data obtained from an acoustic sensor (e.g., a syncopation pattern in music listened to by a user), where the response may vary with the acoustic pattern (e.g., the response may become exaggerated or dissonant in response to a specific type of acoustic pattern).

A motion pattern is one example of a sensor pattern. A motion pattern may be based on motion data obtained from the motion sensor (114). For example, the motion pattern may suggest that the user is engaged in periodic motion that correlates with various physical activities (e.g., running, jogging, dancing, cycling, ascending stairs, descending stairs, or walking). As another example, motion data with a certain pattern of torque values may be correlated with a dancing motion pattern. Similarly, a biofeedback pattern based on data obtained from one or more biofeedback sensors (118) (e.g., a heart rate sensor) may suggest that the user is engaged in strenuous physical activity.

In one or more embodiments, the sensor analyzer (122) may include functionality to recognize a vibration pattern of the primary device (100) based on vibration data obtained from the motion sensor (114). A vibration pattern is an example of a sensor pattern. For example, a vibration pattern of the primary device (100) may correlate to the impedance of the external surface (102). For example, a mobile primary device (100) worn on the wrist may fit loosely or tightly, depending on how a strap has been adjusted. The looseness or tightness of the fit may relate to the amount of impedance of the strap. A loose fit may result in a weak felt vibration, and a tight fit may result in a stronger felt vibration. In one or more embodiments, determining the impedance may be accomplished using data obtained from the motion sensor (114) to measure the vibrations produced by the primary device (100) (e.g., produced by the vibrating actuators (120)). As a secondary benefit, detecting tightness of fit may be helpful in calibrating a biofeedback sensor (118) (e.g., an optical heart-rate or glucose sensor) whose accuracy may depend on the tightness of the fit around the wrist.

In one or more embodiments, a vibration pattern of the primary device (100) may correlate to the texture, or the hardness or softness of the external surface (102). For example, a mobile primary device (100) may be placed on a hard external surface (102), such as a table. In this case, the primary device (100) may cause additional (e.g., low frequency) vibrations due to the mass of the primary device (100) vibrating against the table. These additional vibrations may not be present when the primary device (100) is placed against a soft external surface (102), such as a shirt or pants pocket.

The sensor analyzer (122) may include functionality to drive the sensing elements to transmit transmitter signals and receive the resulting signals. For example, the sensor analyzer (122) may include sensory circuitry that is coupled to the sensing elements. The sensor analyzer (122) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

In some embodiments, the sensor analyzer (122) may digitize analog electrical signals obtained from the sensor electrodes. Alternatively, the sensor analyzer (122) may perform filtering or other signal conditioning. As yet another example, the sensor analyzer (122) may subtract or otherwise account for a baseline, such that the information reflects a difference between the electrical signals and the baseline.

In one or more embodiments of the invention, the response generator (124) may generate a response expressed through one or more effectors (110). In one or more embodiments, a response may include one or more response attributes. For example, the response may be a periodic response whose response attributes include an amplitude, frequency, period and/or phase. In one or more embodiments of the invention, the response may be a haptic signal generated by the response generator (124), and delivered via the vibrating actuators (120). The haptic signal may function as an alert to a user of the primary device (100) to direct the user toward a course of action within the context of an activity that is correlated with a sensor pattern (e.g., a motion pattern). The various haptic signals that may be generated may include a vocabulary of "smart" responses, that may be interpreted as having specific meanings within the context of the activity correlated with the determined sensor pattern.

In one or more embodiments, a response may be delivered to one or more sensors (108). For example, a response may trigger data acquisition by a biofeedback sensor (118). In one or more embodiments, the response generated by the response generator (124) may be based on one or more contextual factors. A contextual factor may be a sensor pattern based on sensor data obtained from one or more sensors (108). In one or more embodiments, the response may depend on the degree to which one or more sensor data values deviate from one or more pre-determined values. For example, an attribute (e.g., amplitude or frequency) of a haptic signal may be decreased when the determined impedance of the external surface (102) exceeds a pre-determined impedance level. As discussed earlier, impedance may be determined by the presence of a certain vibration pattern. Another contextual factor may be a priority assigned to the sensor pattern.

In one or more embodiments, the response may be further based on contextual information obtained from a software application running on the primary device (100). For example, data obtained from a calendar application running on the primary device (100) may indicate that the user is at a certain event (e.g., a concert), which may suggest that the haptic signal be subdued. Alternatively, data obtained from a phone application running on the primary device (100) may indicate that the user is conversing with an important person (e.g., the user's spouse, child or employer), which may also suggest a subdued haptic signal. In one or more embodiments, contextual information may be obtained directly from a user of the primary device (100).

In one or more embodiments, a sensor pattern of the primary device (100) may be augmented with contextual information (e.g., time of day, type of calendar appointment) to generate a contextualized sensor profile that is specific to a user. That is, contextual information regarding whether and how a user responds to alerts may be correlated to various sensor data patterns. For example, a contextualized sensor profile generated for one user may indicate that the user is very still at 7:00 A.M. (e.g., the user is asleep) and may require a stronger response to awaken. However, a contextualized sensor profile generated for a different user may indicate that the user generally awakens at 6:00 A.M. Part of the contextual information may include user feedback regarding whether the user approved of the decision to deliver a stronger or weaker response. As another example, one user may prefer a gentle response during a meeting, while another user may prefer a stronger response in the same context.

Modern wearable devices and smartphones may be able to detect that a user is asleep (e.g., via vibration patterns using data obtained from an accelerometer, and/or data obtained from biofeedback sensors (118), such as brainwave patterns). If the user is asleep, a stronger response may be indicated (i.e., unless a stronger response is contra-indicated by a contextualized sensor profile for the user). In addition, it may be useful for the primary device (100) to deactivate various IoT devices (106) (e.g., television, lights, etc.) upon detecting a sleeping user. For example, "If This, Then That" (hereinafter IFTTT) (https://ifttt.com), Apple Homekit (http://www.applecom/ios/homekit/) and Google Brillo (https://developers.google.com/brillo/) provide standards for interfacing with IoT devices (106).

In one or more embodiments, the response generated by the response generator (124) may be escalated by increasing the value of one or more response attributes (e.g., increasing the amplitude and/or frequency of a periodic haptic signal). The escalation may be based on detecting a sensor pattern (e.g., a motion pattern) in sensor data obtained from one or more sensors (108) of the primary device (100). In one or more embodiments, escalating the response may also be based on contextual information obtained from a software application running on the primary device (100). In one or more embodiments, the response may be escalated when a previous alert (e.g., a haptic signal) issued by the primary device (100) has not been acknowledged (e.g., by a user of the primary device (100)) within a pre-determined time interval. The response may be escalated at periodic intervals until the alert is acknowledged. In one or more embodiments, the response may be escalated at periodic intervals until there is sufficient change in the sensor pattern that triggered the alert. In one or more embodiments, the response may be de-escalated, or reduced (e.g., once the alert is acknowledged) by decreasing the value of one or more response attributes (e.g., decreasing the amplitude and/or frequency of a periodic haptic signal).

In one or more embodiments, a response may be a signal sent by the response generator (124) over the network (104) to an IoT device (106) to request that the IoT device (106) perform an action in the context of an activity being performed by the user of the primary device (100), as indicated by a sensor pattern (e.g., a motion pattern) of the primary device (100). For example, the requested action may be to reduce the speed of the IoT device (106) (e.g., an exercise treadmill) if the motion pattern and/or biofeedback pattern correlates with an exhausted user. In one or more embodiments, the signal may also be based on contextual information obtained from a software application running on the primary device (100).

While FIG. 1 shows a configuration of components, other configurations may be used without departing from the scope of the invention. For example, various components may be combined to create a single component. As another example, the functionality performed by a single component may be performed by two or more components.

Figure 2:
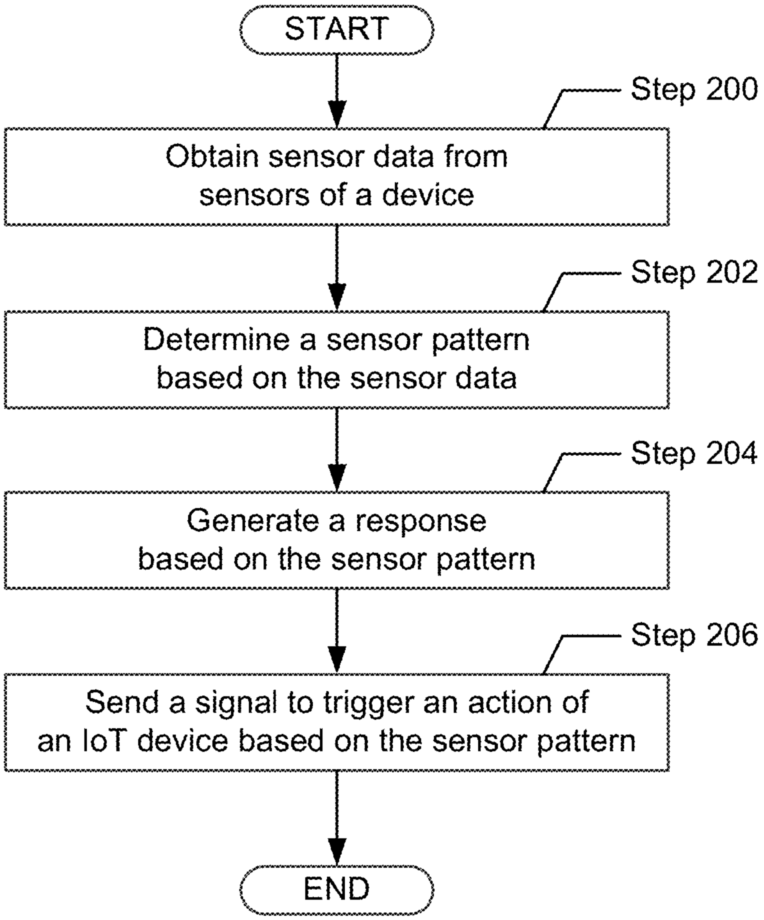
FIG. 2 and FIG. 3 show flowcharts in accordance with one or more embodiments disclosed herein.

FIG. 2 shows a flowchart in accordance with one or more embodiments of the invention. Specifically, one or more steps in FIG. 2 may be performed by the processing system (112) (discussed in reference to FIG. 1). In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, sensor data is obtained from one or more sensors of a device. The sensors of the device may include motion, location, biofeedback and other sensors. Sensor data may be represented in terms of the values of one or more sensor attributes measured at different points in time.

In Step 202, a sensor pattern is determined based on the sensor data. The sensor pattern may represent an interpretation of the sensor data that may be important to the user of the device. Various data analysis, pattern recognition and learning techniques (e.g., training algorithms) may be used to determine a sensor pattern based on the sensor data. In one or more embodiments, a sensor pattern may be determined when the value of a sensor attribute reaches a pre-determined value or range of values (e.g., a tolerance range around a pre-determined value). In one or more embodiments, a sensor pattern may be approximated by a mathematical function. The mathematical function may be periodic, such that a series of values of a sensor attribute may be represented in terms of an amplitude, frequency, period and/or phase. In one or more embodiments, to facilitate analysis of the sensor data, the sensor analyzer may convert the representation of time-based sensor data to a frequency-based representation (e.g., a Fourier series or transform). A sensor pattern may be assigned a priority (e.g., certain patterns in the data obtained from biofeedback sensors may be assigned a high priority).

In Step 204, a response is generated based on the sensor pattern. The response may be generated by the effectors of the device. The response may function as an alert to the user of the device to direct the user toward a course of action, based on one or more sensor patterns determined above in Step 202. If more than one sensor pattern has been determined, then the priorities of the sensor patterns may be used to determine the relative impact of the different sensor patterns on generating the haptic signal.

In Step 206, a signal is sent to an IoT device to trigger an action of the IoT device, based on the sensor pattern. The signal may also be based on contextual information obtained from the user or a software application running on the device. For example, the requested action may be to reduce the speed of or turn off an exercise treadmill (the IoT device) if the sensor pattern (e.g., a heart rate sensor pattern) correlates with a dangerously exhausted user.

Figure 3:
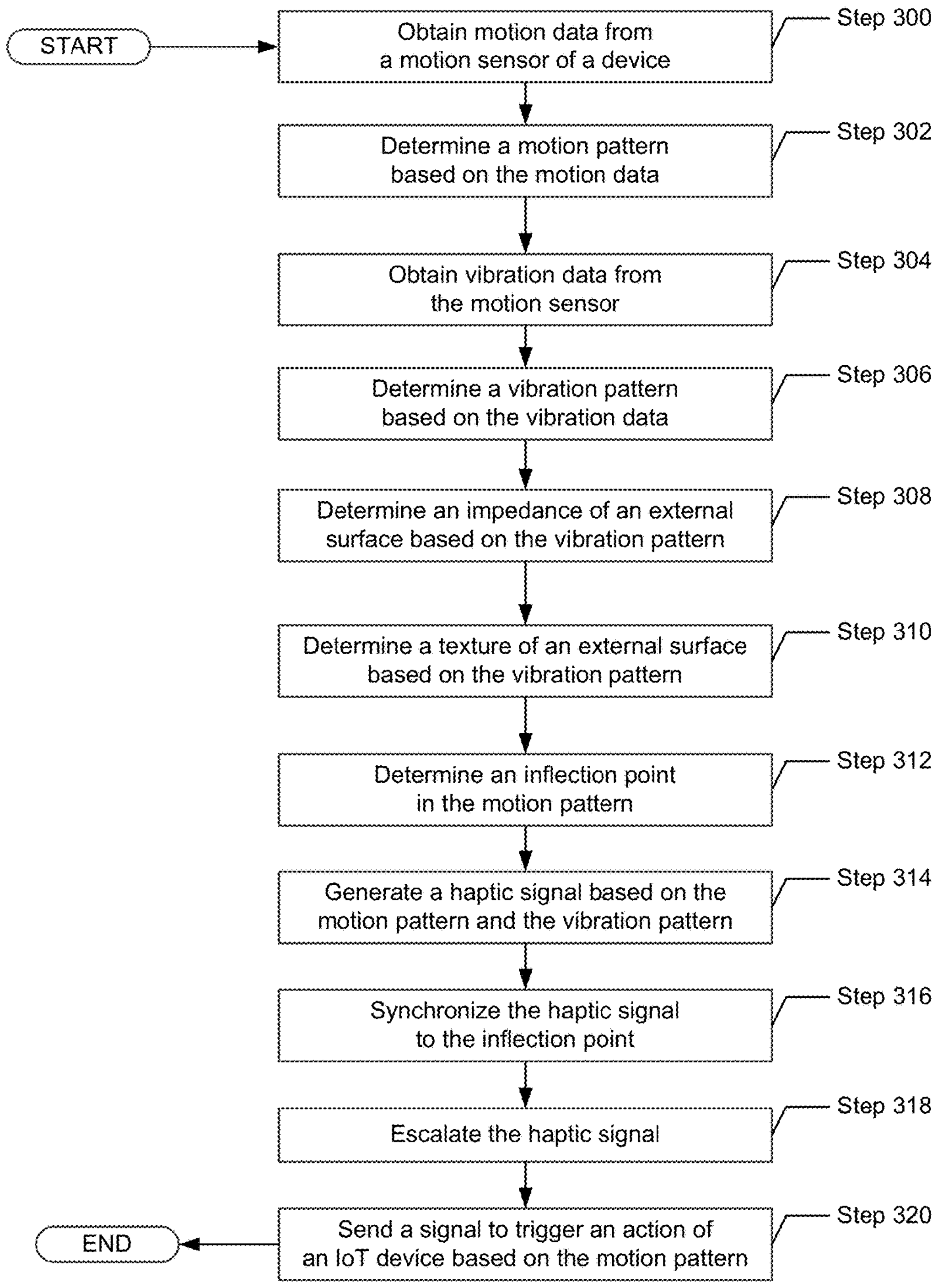

FIG. 3 shows a flowchart, in accordance with one or more embodiments of the invention. Specifically, the flowchart in FIG. 3 is directed to the use of motion sensors in determining the haptic response. In addition, one or more steps in FIG. 2 may be performed by the processing system (112) (discussed in reference to FIG. 1). In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

In Step 300, motion data is obtained from a motion sensor of a device. The motion data may be represented in terms one or more motion attributes (e.g., velocity, acceleration, and torque) measured at different points in time.

In Step 302, a motion pattern is determined based on the motion data. The motion pattern represents an interpretation of the motion data that enables the device to provide useful alerts the user (e.g., via a haptic signal). For example, the motion pattern may be correlated with a type of activity (e.g., jogging, cycling, or walking) by the user of the device. For example, it may be useful to determine when the motion of the device reaches a pre-determined velocity, acceleration, or torque.

In Step 304, vibration data is obtained from the motion sensor. The vibration data may be represented in terms of one or more vibration attributes (e.g., velocity, acceleration, and damping) measured at different points in time.

In Step 306, a vibration pattern is determined based on the vibration data. The vibration pattern represents an interpretation of the vibration data that enables the device to perform a useful adjustment in its communication with the user. For example, the haptic signal may be adjusted to compensate for the vibration pattern.

For example, it may be determined, in Step 308, that the vibration pattern is correlated with the presence of an external surface (e.g., a shirt or pants pocket) in contact with the device that has high or low impedance (e.g., corresponding to a tight or loose fit). That is, a pocket may have a tight fit and high impedance, or a loose fit and low impedance. In one or more embodiments, an impedance value may be determined based on analyzing the vibration pattern. In one or more embodiments, the determined impedance value may be proportional to the amplitude of the vibrations produced by the device. For example, a low amplitude may indicate a loose fit and a high amplitude may indicate a tight fit.

Similarly, it may be determined, in Step 310, that the vibration pattern correlates with the presence of an external surface in contact with the device that has a hard (e.g., a table) or soft (e.g., a sofa) texture. In one or more embodiments, a texture value may be determined based on analyzing the vibration pattern. For example, a soft texture may result in a weak felt vibration, and a hard texture may result in a stronger felt vibration. In one or more embodiments, the determined texture (e.g., level of hardness) may be proportional to the amplitude of the vibrations produced by the device. Detecting the presence of additional vibrations due to the device's contact with a hard external surface may indicate that an attribute (e.g., the amplitude) of the haptic signal may need to be reduced to avoid excessive vibration of the device.

In Step 312, an inflection point is determined in the motion pattern. That is, there may be a point in the motion pattern where an important change occurs, representing an opportune moment to communicate (e.g., via a haptic signal) to the user of the device. For example, an inflection point may occur when the direction of motion changes, the velocity reaches zero, or a pre-determined target velocity or acceleration is reached. In one or more embodiments, inflection points may also be determined in patterns based on data obtained from other sensors (e.g., biofeedback sensors) of the device.

In Step 314, a haptic signal is generated based on the motion pattern and the vibration pattern. See earlier discussion in the description of generating a haptic signal based on a sensor pattern in Step 204. The haptic signal may function as an alert to a user of the device to direct the user toward a course of action within the context of an activity that correlates the motion pattern.

The haptic signal may function as an alert to direct the user toward a course of action within the context of an activity consistent with the motion pattern determined above in Step 302, and accounting for vibration patterns determined above in Step 308 and Step 310. For example, when the impedance value determined in Step 308 is below a certain threshold value, then the haptic signal may be adjusted (e.g., by increasing an attribute of the haptic signal, such as amplitude or frequency) to compensate for the low impedance, to enable the haptic signal to be more clearly felt by the user of the device. And if the impedance value generated in Step 308 exceeds a certain threshold value, then the haptic signal may be adjusted (e.g., by decreasing an attribute of the haptic signal, such as amplitude or frequency) to compensate for the high impedance, to avoid generating a haptic signal that is excessively strong.

Similarly, when the texture value determined in Step 310 is below a threshold value, then the haptic signal may be adjusted (e.g., by increasing an attribute of the haptic signal, such as amplitude or frequency) to compensate for the soft texture, to enable the haptic signal to be more clearly felt by the user of the device. And if the texture value generated in Step 310 exceeds a certain threshold value, then the haptic signal may be adjusted (e.g., by decreasing an attribute of the haptic signal, such as amplitude or frequency) to compensate for the hard texture, to avoid generating a haptic signal that is excessively strong.

In one or more embodiments, there may be more than one motion pattern and more than vibration pattern to consider when generating the haptic signal. In addition, the haptic signal may also be based on patterns based on data obtained from other sensors (e.g., biofeedback sensors) of the device.

In Step 316, the haptic signal is synchronized to the inflection point determined in Step 312. An inflection point in a motion pattern may represent a useful point to provide feedback to a user of the device. For example, if the motion pattern correlates to a jogging motion pattern, then a haptic signal that is synchronized to the apex of arm motion (e.g., where the velocity of the arm becomes zero) may assist the user of the device in maintaining a pre-determined pace.

In Step 318, the haptic signal is escalated. That is, the values of one or more attributes (e.g., amplitude or frequency) of the haptic signal may be increased. The escalation may be based on the motion pattern, the vibration pattern, and/or contextual information obtained from the user or a software application running on the device. This contextual information may be the lack of an acknowledgment of an alert from the device to the user within a pre-determined time interval. In one or more embodiments, the response may be escalated at periodic intervals until the user acknowledges an alert. In one or more embodiments, the response may be escalated at periodic intervals until there is a sufficient amount of change in the sensor pattern (e.g., motion pattern) that triggered the alert. In one or more embodiments, the response may be reduced (e.g., once the alert is acknowledged) by decreasing the value of one or more response attributes (e.g., amplitude and/or frequency of a periodic haptic signal).

In Step 320, a signal is sent to an IoT device to trigger an action of the IoT device, based on the motion pattern. The signal may also be based on contextual information obtained from the user or a software application running on the device. For example, the requested action may be to reduce the speed of or turn off an exercise treadmill (the IoT device) if the motion pattern correlates with a dangerously exhausted user.

The flowcharts in FIG. 2 and/or in FIG. 3 may be repeated continuously as new sensor data is obtained from the sensors of the device.

Figure 4:
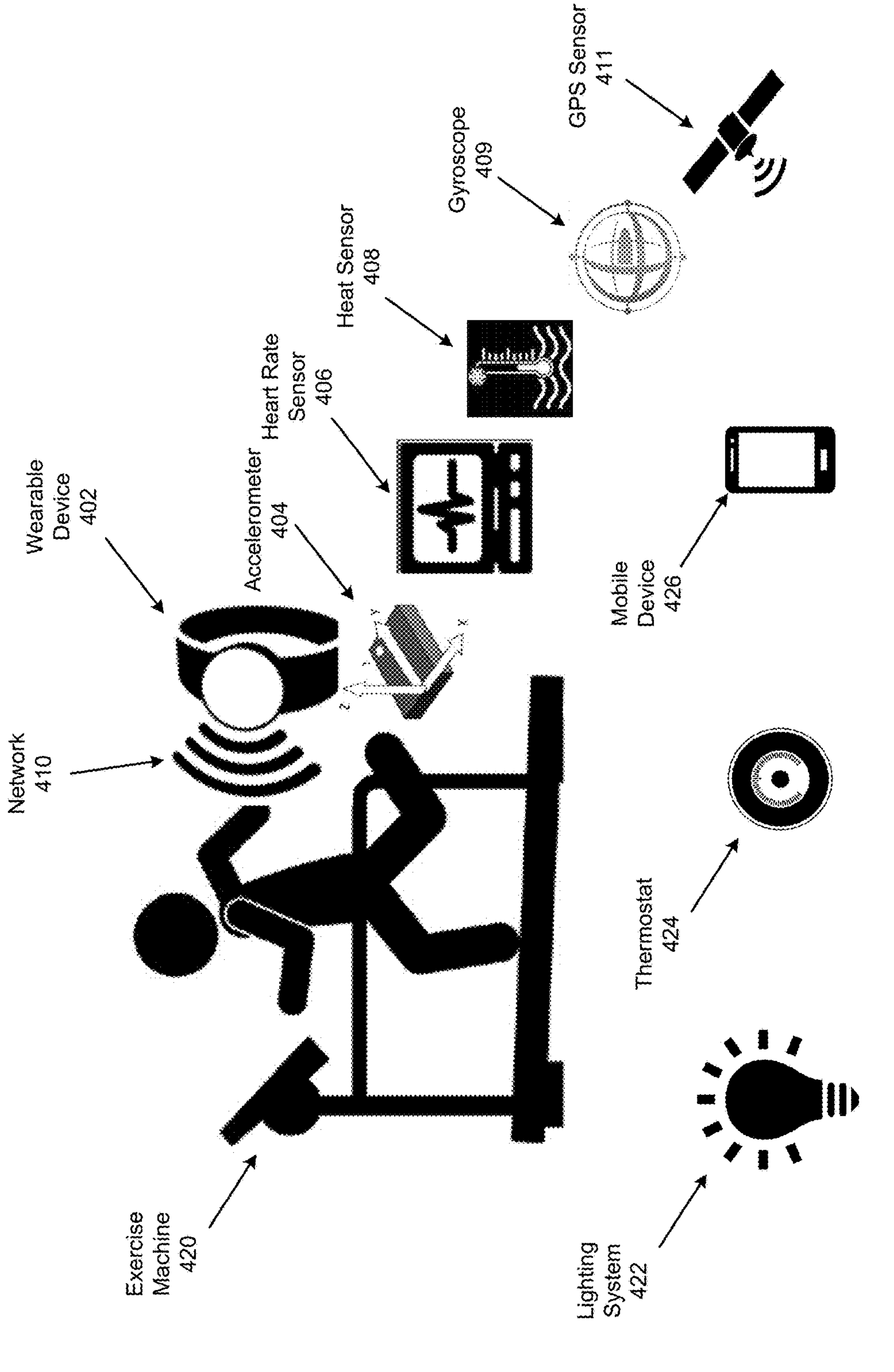
FIG. 4 shows an example in accordance with one or more embodiments disclosed herein.

The following example is for explanatory purposes only and not intended to limit the scope of the invention. FIG. 4 shows a wearable device (402) that includes an accelerometer (404), a heart rate sensor (406), a heat sensor (408), a gyroscope (409) and a global positioning system (GPS) sensor (411). The wearable device (402) also includes vibrating actuators (not shown) capable of delivering a haptic signal. The user is exercising on an exercise machine (420). A lighting system (422) controls the lighting in the room containing the exercise machine (420). A thermostat (424) controls the temperature in the room containing the exercise machine (420). A mobile device (426) is used by a nearby social network contact of the user. The exercise machine (420), lighting system (422), thermostat (424), and mobile device (426) are IoT devices accessible by the wearable device (402) over a network (410).

A motion pattern is determined based on motion data obtained from the accelerometer (404). The motion pattern is periodic, and correlates to exercising on a treadmill. An inflection point is determined within the periodic motion pattern where the direction of motion changes. A default haptic signal is synchronized to the inflection point to assist the user in maintaining a pre-determined pace (e.g., a pace determined by a fitness software application of the wearable device (402), or determined by an IFTTT rule for the wearable device (402)). In addition, activation of the heart rate sensor (406) is synchronized to the inflection point because the accuracy of the heart rate sensor (406) is greater at the point of least motion.

A vibration pattern is determined based on motion data obtained from the accelerometer (404). The vibration pattern correlates with the wearable device (402) loosely fitting on the user's wrist. As a result, the haptic signal is adjusted to compensate for the loose fit (e.g., by increasing the amplitude of the haptic signal), thereby making it easier for the user to detect the haptic signal.

During the exercise session, a heat pattern is determined, based on heat sensor data obtained from the heat sensor (408) that correlates with an over-heating warning (e.g., based on information obtained from a fitness software application running on the wearable device (402)). In response to determining the heat sensor pattern, the wearable device (402) sends a signal over the network (410) instructing the thermostat (424) to cool down the room.

Also during the exercise session, a heart rate pattern is determined, based on heart rate data obtained from the heart rate sensor (406), that correlates with an over-exertion warning (e.g., based on information obtained from a fitness software application running on the wearable device (402)). Furthermore, a newly determined motion pattern may have become more irregular, which may also correlate an over-exertion warning. For example, a pattern in the data on the orientation of the wearable device (402) obtained from the gyroscope (409) may correlate with erratic motion by the user. In response to determining the over-exertion heart rate pattern and irregular motion pattern, the wearable device (402) alerts the user via a haptic signal. However, the user continues to exercise without acknowledging this alert, and the user's heart rate continues to increase.

After a pre-determined amount of time has elapsed, the wearable device (402) again alerts the user, this time via an escalated haptic signal (e.g., with increased amplitude or frequency). But again, the alert is unacknowledged. After yet another pre-determined amount of time has elapsed, the wearable device (402) chooses a different strategy for alerting the user. This time, the wearable device (402) sends a message over the network (410) to the lighting system (422), instructing the lighting system (422) to blink the lights off and on, in an attempt to get the user's attention. However, the user, undeterred, continues to exercise and ignores the alert. After another (shorter) pre-determined amount of time has elapsed, the wearable device (402) sends a message over the network (410) to a mobile device (426) used by a nearby social network contact of the user (e.g., obtained from a social networking application of the wearable device (402)). For example, a message may be sent to a mobile device (426) of a fitness coach who may be located in the same facility as the room containing the exercise machine (420).

In one scenario, data may be obtained from the GPS (411) sensor indicating the user's precise position within the facility. The user's position, combined with contextual information regarding the precise layout of the equipment in the exercise facility containing the exercise machine (420), may be useful in formulating a message to the user suggesting that the user move to a different exercise machine positioned within the same facility that requires less exertion.

Finally, after being contacted by the social network contact, the user acknowledges the alert, and begins to reduce his or her pace, and starts winding down the exercise session. During the winding down phase, the wearable device (402) may again alert the user regarding the over-exertion heart rate pattern, but this time the alert is de-escalated (e.g., by reducing the amplitude or frequency of the haptic signal), since an alert has already been acknowledged. Another reason for de-escalating the alert may be that the over-exertion heart rate pattern is not as strong during the winding-down phase.

Alternatively, if the user had ignored the message from the social contact, and continued exercising at the previous pace, the wearable device (402) may next send a message over the network (410) to the exercise machine (420), instructing the exercise machine (420) to initiate a shutdown sequence.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:

obtaining vibration data from a motion sensor of a plurality of sensors of a primary device;

determining a vibration pattern based on the vibration data;

determining, based on the vibration pattern, an impedance of an external surface in contact with the primary device;

generating a response based on the vibration pattern and the impedance; and sending a signal over a network to a secondary device to trigger an action that adjusts a behavior of the secondary device, wherein the signal is based on the vibration pattern and the impedance.

2. The method of claim 1 wherein the response comprises a haptic signal.

3. The method of claim 1, further comprising:

determining, based on the vibration pattern, a texture of the external surface, wherein generating the response is further based on the texture.

4. The method of claim 1, further comprising:

determining an inflection point in the motion pattern; and synchronizing the response to the inflection point.

5. The method of claim 1, further comprising escalating the response.

6. The method of claim 1, further comprising:

obtaining biofeedback data from a biofeedback sensor of the plurality of sensors; and determining a biofeedback pattern based on the biofeedback data, wherein generating the response is further based on the biofeedback pattern.

7. A primary device comprising:

a plurality of sensors;

a plurality of effectors;

a sensor analyzer configured to obtain vibration data from a motion sensor of the plurality of sensors, determine a vibration pattern based on the vibration data, and determine, based on the vibration pattern, an impedance of an external surface in contact with the primary device; and a response generator configured to cause the plurality of effectors to generate a response based on the vibration pattern and the impedance, and send a signal over a network to a secondary device to trigger an action that adjusts a behavior of the secondary device, wherein the signal is based on the vibration pattern and the impedance.

8. The device of claim 7, wherein the plurality of effectors comprises a plurality of vibrating actuators, and wherein the response generator is further configured to cause the plurality of vibrating actuators to generate a haptic signal based on the sensor pattern.

9. The device of claim 7, wherein the sensor analyzer is further configured to:

determine, based on the vibration pattern, a texture of the external surface, wherein generating the response is further based on the texture.

10. The device of claim 7, wherein the sensor analyzer also determines an inflection point in the motion pattern, and wherein the response generator also causes the plurality of effectors to synchronize the response to the inflection point.

11. The device of claim 7, wherein the response generator is further configured to:

cause the plurality of effectors to escalate the response.

12. The device of claim 7, wherein the sensor analyzer is further configured to:

obtain biofeedback data from a biofeedback sensor of the plurality of sensors; and determine a biofeedback pattern based on the biofeedback data, wherein generating the response is further based on the biofeedback pattern.

13. A primary device comprising:

a plurality of sensors;

a plurality of effectors;

a sensor analyzer configured to obtain motion data from a motion sensor of the plurality of sensors, determine a motion pattern based on the motion data, and determine an inflection point in the motion pattern; and a response generator configured to cause the plurality of effectors to generate a response based on the motion pattern, synchronize the response to the inflection point, and send a signal over a network to a secondary device to trigger an action that adjusts a behavior of the secondary device, wherein the signal is based on the motion pattern.

14. The device of claim 13, wherein the plurality of effectors comprises a plurality of vibrating actuators, and wherein the response generator is further configured to cause the plurality of vibrating actuators to generate a haptic signal based on the sensor pattern.

15. The device of claim 13, wherein the sensor analyzer is further configured to:

obtain vibration data from the motion sensor;

determine a vibration pattern based on the vibration data; and determine, based on the vibration pattern, an impedance of an external surface in contact with the primary device, wherein generating the response is further based on the vibration pattern and the impedance, wherein the signal is further based on the vibration pattern and the impedance.

16. The device of claim 13, wherein the response generator is further configured to:

cause the plurality of effectors to escalate the response.

17. The device of claim 13, wherein the sensor analyzer is further configured to:

obtain biofeedback data from a biofeedback sensor of the plurality of sensors; and determine a biofeedback pattern based on the biofeedback data, wherein generating the response is further based on the biofeedback pattern.

18. The method of claim 1, wherein adjusting the behavior of the secondary device comprises reducing a speed of the secondary device.

19. The device of claim 7, wherein adjusting the behavior of the secondary device comprises reducing a speed of the secondary device.

20. The device of claim 13, wherein adjusting the behavior of the secondary device comprises reducing a speed of the secondary device.

* * * * *